US006830065B2

(12) United States Patent
Sinur et al.

(10) Patent No.: US 6,830,065 B2
(45) Date of Patent: Dec. 14, 2004

(54) DUCT CONNECTOR APPARATUS AND METHOD

(75) Inventors: Richard R. Sinur, Oconomowoc, WI (US); Tom Heidel, Hartford, WI (US)

(73) Assignee: Broan-NuTone LLC, Hartford, WI (US)

(*) Notice: Subject to any disclaimer, the term of this patent is extended or adjusted under 35 U.S.C. 154(b) by 377 days.

(21) Appl. No.: 10/044,803

(22) Filed: Jan. 11, 2002

(65) Prior Publication Data

US 2003/0131891 A1 Jul. 17, 2003

(51) Int. Cl.⁷ ............................. F16K 15/03; F16L 55/07
(52) U.S. Cl. ............................. 137/527.8; 285/148.24; 285/424
(58) Field of Search ................. 137/527.8; 110/163; 126/285 R; 454/330, 333, 370; 285/148.18, 148.23, 148.24, 328, 332.1, 424; 138/120, 177, 178, DIG. 4

(56) References Cited

U.S. PATENT DOCUMENTS

| | | | |
|---|---|---|---|
| 590,374 A | | 9/1897 | Osburn |
| 1,026,607 A | * | 5/1912 | Scherer .................. 285/424 |
| 1,280,312 A | * | 10/1918 | Scherer .................. 285/424 |
| 1,374,866 A | | 4/1921 | Spencer |
| 1,457,126 A | * | 5/1923 | Scherer .................. 285/424 |
| 1,462,482 A | * | 7/1923 | Buller ................. 285/148.24 |
| 1,860,521 A | * | 5/1932 | Anderson ............ 285/148.18 |
| 1,881,679 A | | 10/1932 | Klomparens |
| 2,093,515 A | * | 9/1937 | Filkins ................... 137/527.8 |
| 2,216,864 A | | 10/1940 | Wasmund |
| 2,359,725 A | | 10/1944 | Berger et al. |
| 2,825,431 A | | 3/1958 | Molt |
| 3,061,338 A | * | 10/1962 | Clark .................... 285/424 |
| 3,109,670 A | * | 11/1963 | Engel .................... 285/424 |
| 3,965,933 A | | 6/1976 | Beaudin |
| 4,002,110 A | * | 1/1977 | Teodorescu et al. ..... 137/527.8 |
| 4,173,361 A | * | 11/1979 | Gagas ................... 285/424 |
| 4,683,798 A | * | 8/1987 | Piesik ................... 89/1.816 |
| 5,878,786 A | | 3/1999 | Elder |

OTHER PUBLICATIONS

Photographs of existing device sold prior to Jan. 11, 2002.

\* cited by examiner

Primary Examiner—John Rivell
(74) Attorney, Agent, or Firm—Michael Best & Friedrich LLP

(57) ABSTRACT

The duct connector of the present invention preferably has a rectangular inlet and a round outlet. An intermediate passage is located between the rectangular inlet and the round outlet. Preferably, the intermediate passage provides a smooth transition that is substantially free from steps, sharp corners, breaks or facets, and acts to smoothly funnel airflow from the rectangular inlet to the round outlet. The intermediate passage preferably includes transitional surfaces that connect adjacent walls of the duct. Each transitional surface preferably provides a single smooth continuously curved surface connecting a side wall and an adjacent end wall along the intermediate passage. The smooth transition of the intermediate passage and the use of transitional surfaces as just described reduces turbulence and noise within the duct connector and results in greater fan or blower efficiency.

29 Claims, 20 Drawing Sheets

SECTION E-E

DUCT CONNECTOR APPARATUS AND METHOD

FIELD OF THE INVENTION

This invention relates generally to connectors for air ducts and housings, and more particularly to connectors used to connect housings and ducts having inlets and outlets of different shapes and/or sizes.

BACKGROUND OF THE INVENTION

Air ducts used in homes and buildings are commonly used to transport air from a fan or blower to another location (e.g., a roof exhaust outlet, exterior exhaust vents, and the like). Similarly, air ducts can also be connected to inlets of a fan or blower housing. Unfortunately however, the shape of ducts and the shape of housings to which the ducts are connected are not the same. For example, the exhaust outlet of many existing fan or blower housings are often rectangular, while the cross-sectional shape of many types of commonly-used ducts is round. Similar problems can arise in trying to connect ducts together that have different sizes or shapes and in trying to connect housings having different inlet and outlet shapes.

As is well-known to those skilled in the art, duct connectors exist for connecting housings to ducts, ducts to ducts, and housings to housings when such elements being connected have inlets and outlets that do not match in size, shape, or size and shape. These duct connectors are tubular passages through which fluid flows as it is forced from housing to duct, duct to duct, or housing to housing by a fan, blower, or other air moving device.

As developments in air flow technology continue to be made, the importance of noise, power consumption, and cost in all aspects of air handling systems has increased significantly. For example, differences in noise levels of fan or blower assemblies and their connected ducts can mean the difference between acceptable and unacceptable assemblies and systems. As another example, the need to efficiently move air with minimal turbulence has been driven at least in part by the desire to low fan or blower speeds or to employ smaller fans or blowers in the same systems. Both results can save energy and lower noise in air handling systems.

Despite the needs for more efficient air handling systems and the advancements made in other areas of air handling systems, existing duct connectors remain a large cause of turbulence, fan or blower inefficiency, and noise. A significant cause of these problems is related to the shape of such duct connectors. An example of a conventional duct connector is illustrated in FIGS. 1–10. The duct connector (indicated generally at 10) is employed to connect a rectangular outlet of a housing or duct with a round inlet of a housing or duct, and is shown by way of example only.

To produce the transition between a rectangular inlet and an round outlet, the duct connector has a transitional passage which is shaped to join a rectangular end 6 of the duct connector with a round end 8. As is typical with conventional duct connectors, the duct connector 10 illustrated in FIGS. 1–10 establishes this connection by employing a transitional section 22 having multiple walls which define a number of steps, angled and multi-faceted surfaces, and sharp corners and breaks. Such features are often even more pronounced when the cross-sectional area of the duct connector inlet is different in size than the cross-sectional area of the outlet (as it is in the case of the duct connector 10 illustrated in FIGS. 1–10).

The steps, angled and multi-faceted surfaces, and sharp corners and breaks found in the transitional section 22 of the duct connector 10 significantly affects fluid flow through the duct connector 10. In particular, these features create turbulence, which creates noise and lowers the efficiency of the fan, blower, or other air moving device used to generate air flow through the duct connector 10. As a result, the air moving device must either be run at higher speeds or must be selected to be stronger in order to perform properly. Both of these options result in noise and inefficiency.

In light of the problems and limitations of the prior art described above, a need exists for a duct connector which lowers turbulence, improves air flow, enables the use of smaller air moving devices or the operation of air moving devices at lower speeds, and reduces noise. Each preferred embodiment of the present invention achieves one or more of these results.

SUMMARY OF THE INVENTION

The duct connector of the present invention preferably provides an improved transition of air flow between duct connector inlet and outlet shapes that differ in size and/or shape. The duct connector can be used to connect an inlet or outlet of a housing to a duct, can be used to connect ducts together, and can be used to connect housings together. By way of example, the duct connector of the present invention can be used to connect an exhaust outlet of a fan or blower housing to a duct having a different cross-sectional shape and size.

In some preferred embodiments, the duct connector has a rectangular inlet or passage at one end and a round outlet or passage at another end to connect a housing having a rectangular exhaust port to a duct having a round cross-sectional shape. Preferably, the duct connector has an intermediate passage that is located between the rectangular inlet or passage and the round outlet or passage. The intermediate passage preferably provides a smooth transition that is substantially free from steps and sharp corners between the rectangular passage to the round passage. In some embodiments, the intermediate passage includes opposing end walls and opposing side walls. These walls are joined together with transitional surfaces running along at least part of the intermediate passage. Preferably, each transitional surface provides a single smooth continuously curved surface between each side wall and adjacent end walls along the intermediate passage.

The smooth transition of the intermediate passage between the rectangular inlet or passage and the round inlet or passage helps to reduce turbulence within the duct connector. The smooth curved transitional surfaces interconnecting the side walls and end walls (described above) along the intermediate passage also helps to reduce turbulence within the duct connector. By employing these smooth transitions, the duct connector of the present invention can maintain or exceed air flow rates comparable to existing duct connectors while reducing the speed at which the connected fan, blower, or other air moving device operates. The smooth transitions therefore permit the motor driving the air moving device to be tuned down to run more efficiently and to reduce noise generated by the air moving device and noise related to air flow through the duct connector.

Duct connectors are commonly classified by a rated performance in terms of volumetric air flow through the connector. Some preferred embodiments of the duct connector according to the present invention achieve a similar rated performance of air flow as existing connectors while permitting the speed of the motor driving the fan, blower, or other air moving device to be reduced. The duct connector can also reduce the amount of noise generated by the motor and related to air flow through the duct connector.

More information and a better understanding of the present invention can be achieved by reference to the following drawings and detailed description.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

Figure 1:
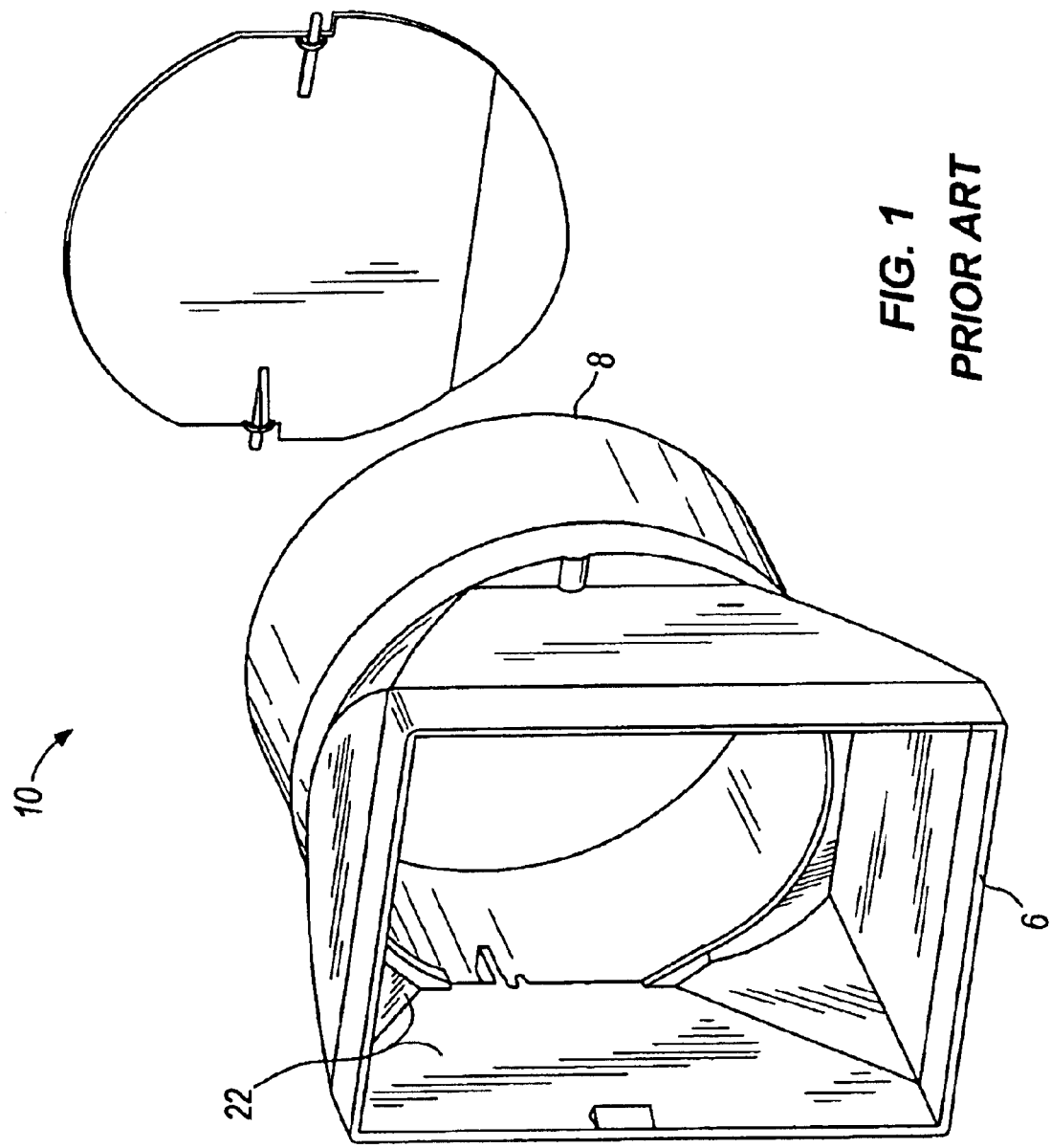
FIG. 1 is a front perspective view of a duct connector according to the prior art.
Figure 2:
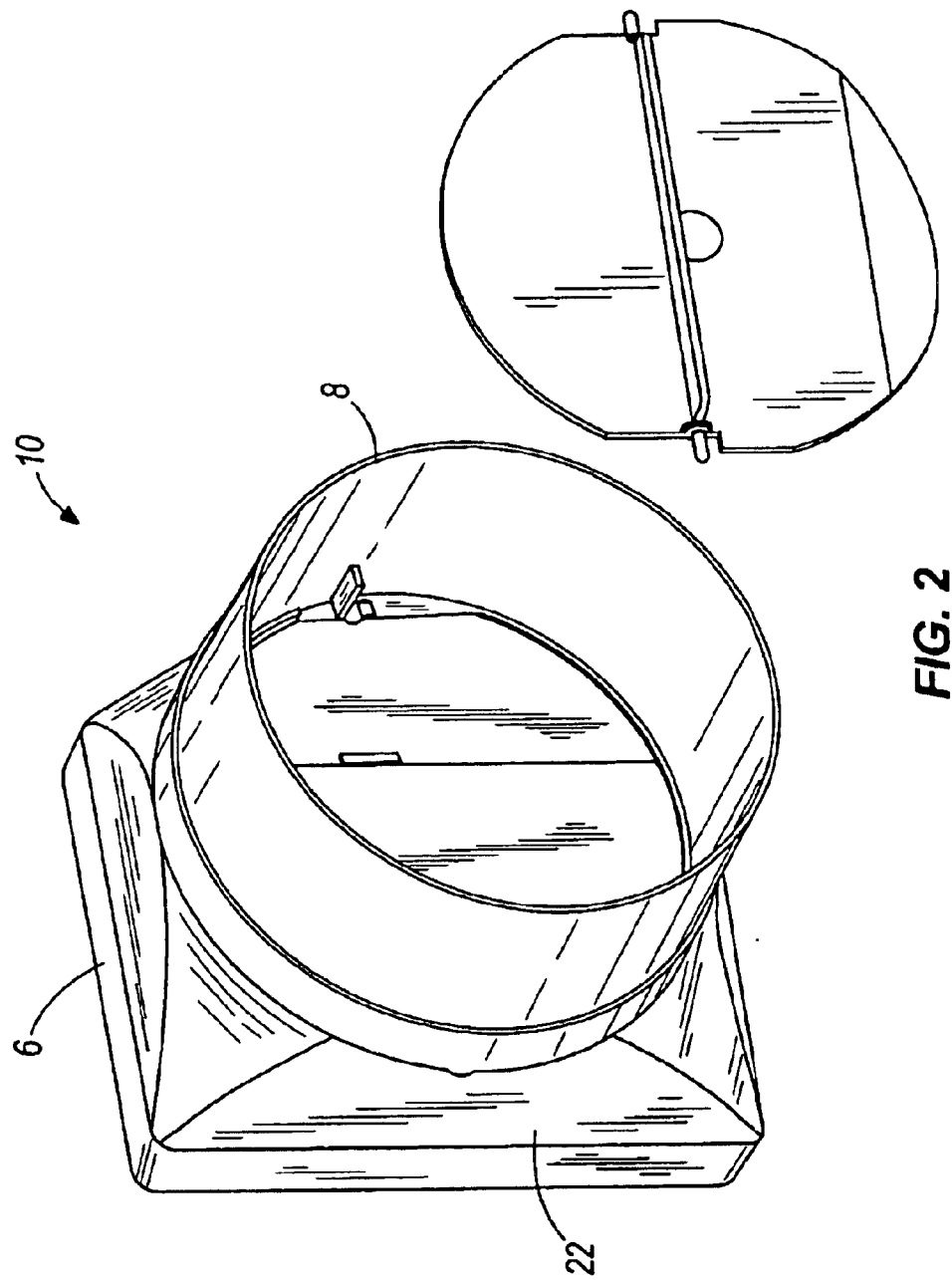
FIG. 2 is a rear perspective view of the duct connector shown in FIG. 1.
Figure 3:
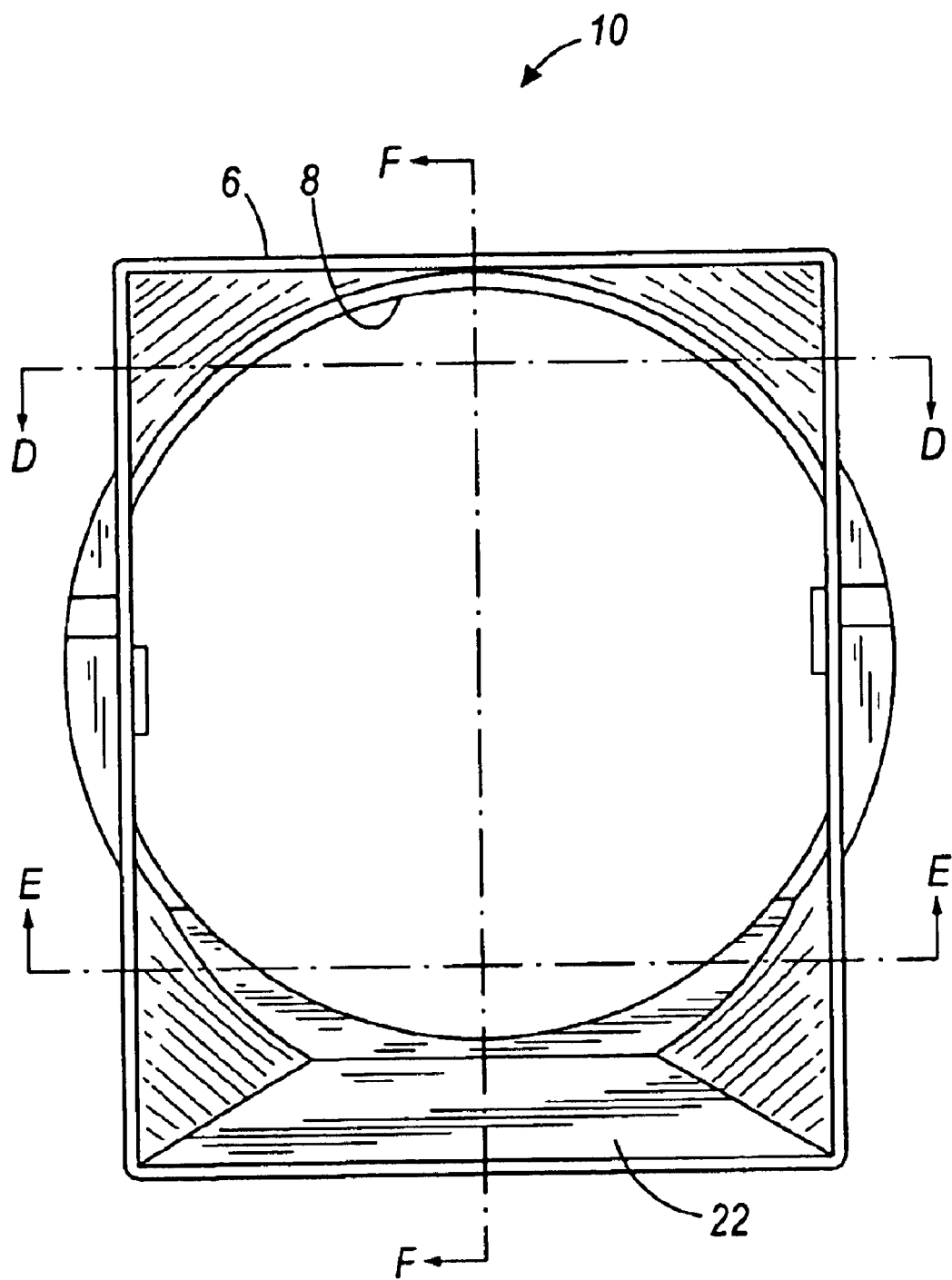
FIG. 3 is an elevational view of an end of the duct connector shown in FIGS. 1 and 2.
Figure 4:
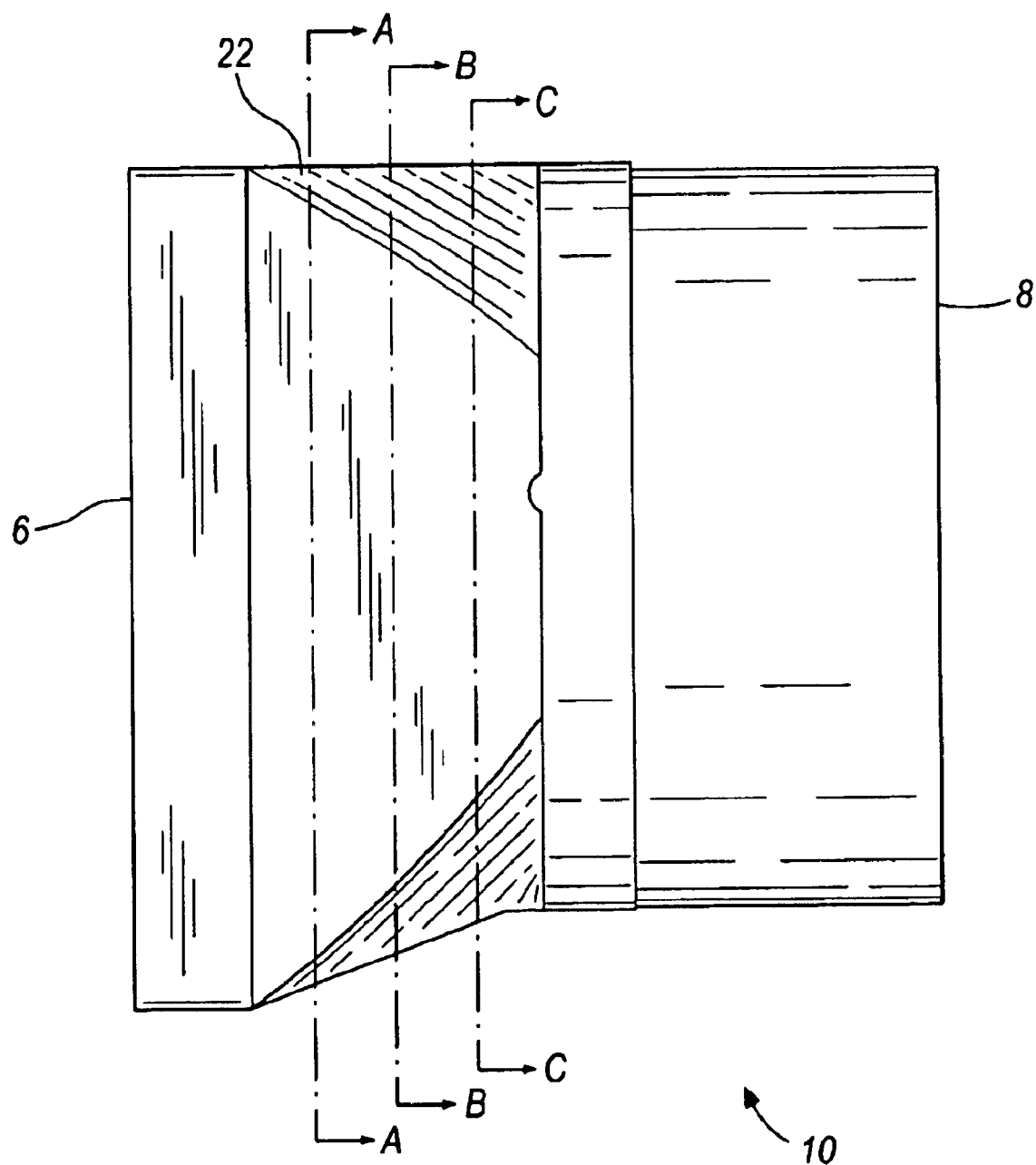
FIG. 4 is an elevational view of a side of the duct connector shown in FIGS. 1–3.
Figure 5:
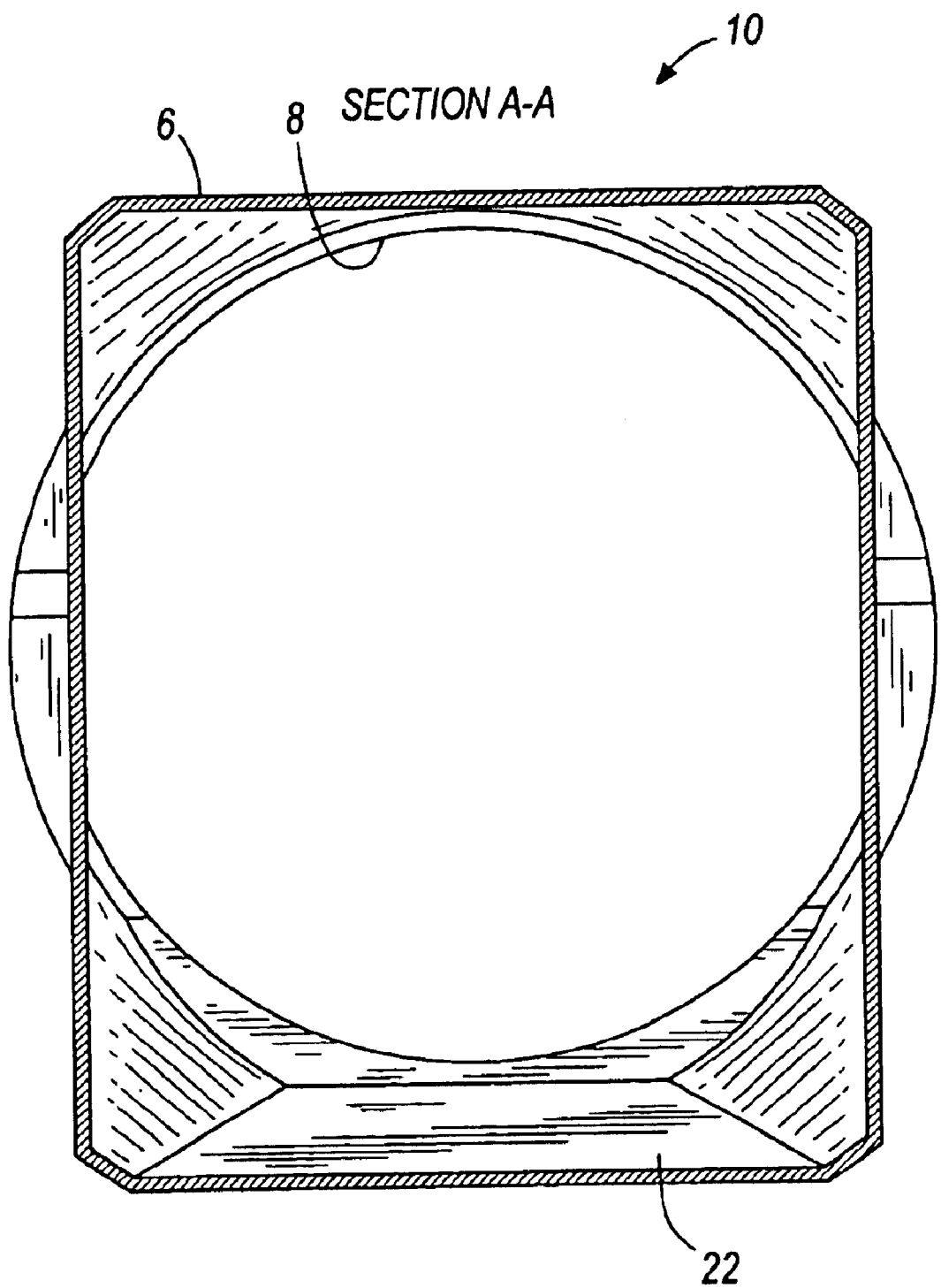
FIG. 5 is a cross-sectional view of the duct connector shown in FIGS. 1–4, taken along lines A—A of FIG. 4.
Figure 6:
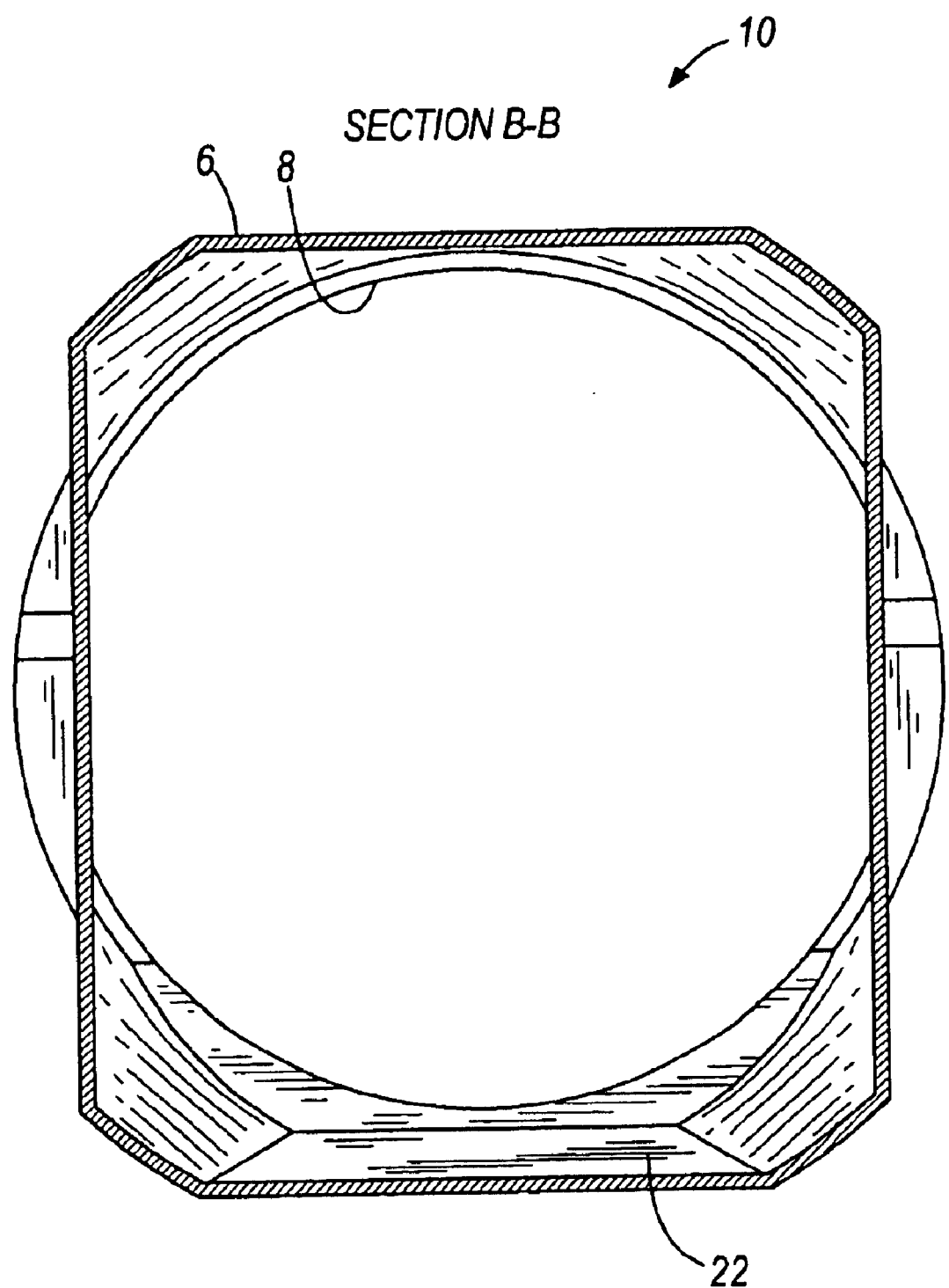
FIG. 6 is a cross-sectional view of the duct connector shown in FIGS. 1–4, taken along lines B—B of FIG. 4.
Figure 7:
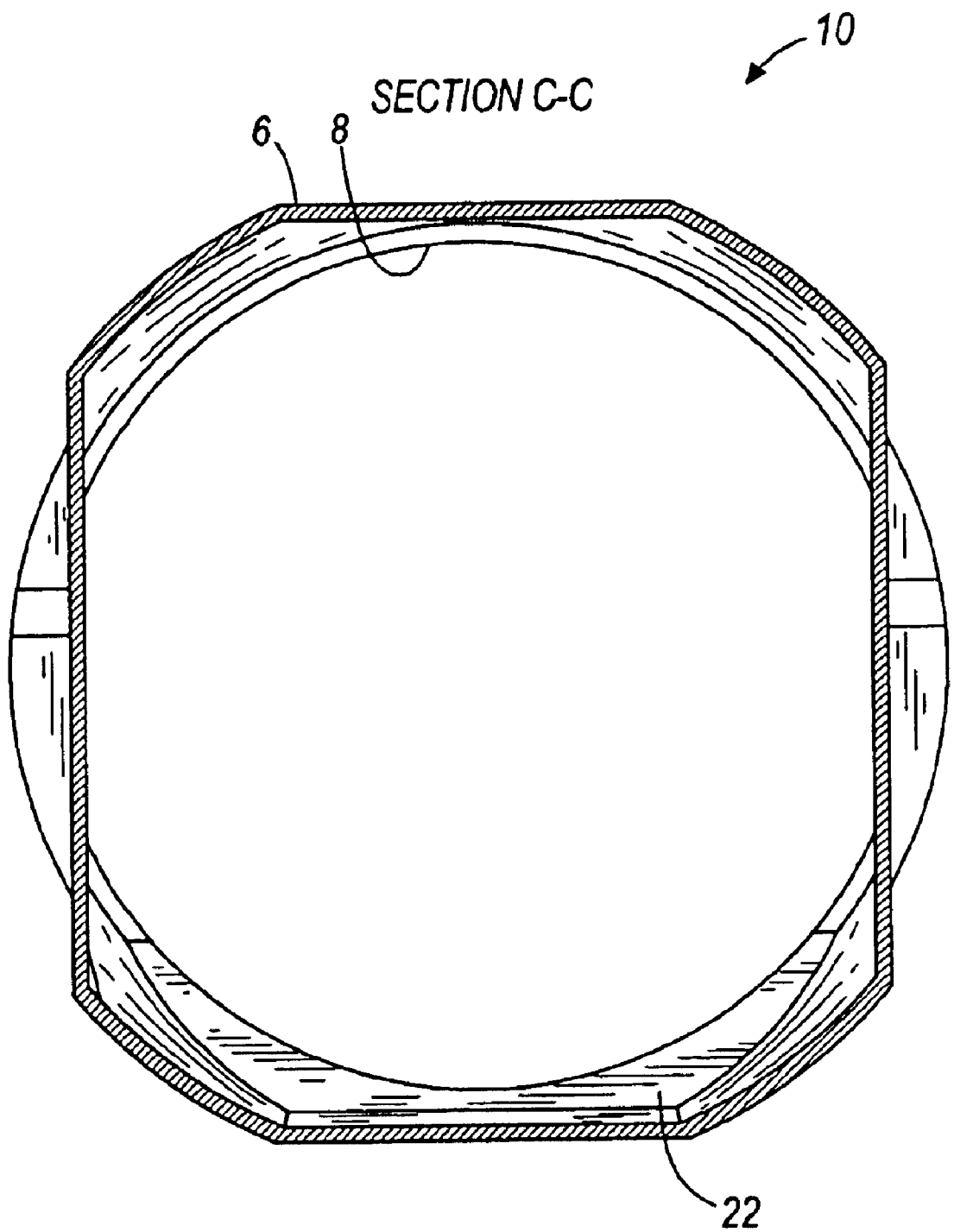
FIG. 7 is a cross-sectional view of the duct connector shown in FIGS. 1–4, taken along lines C—C of FIG. 4.
Figure 8:
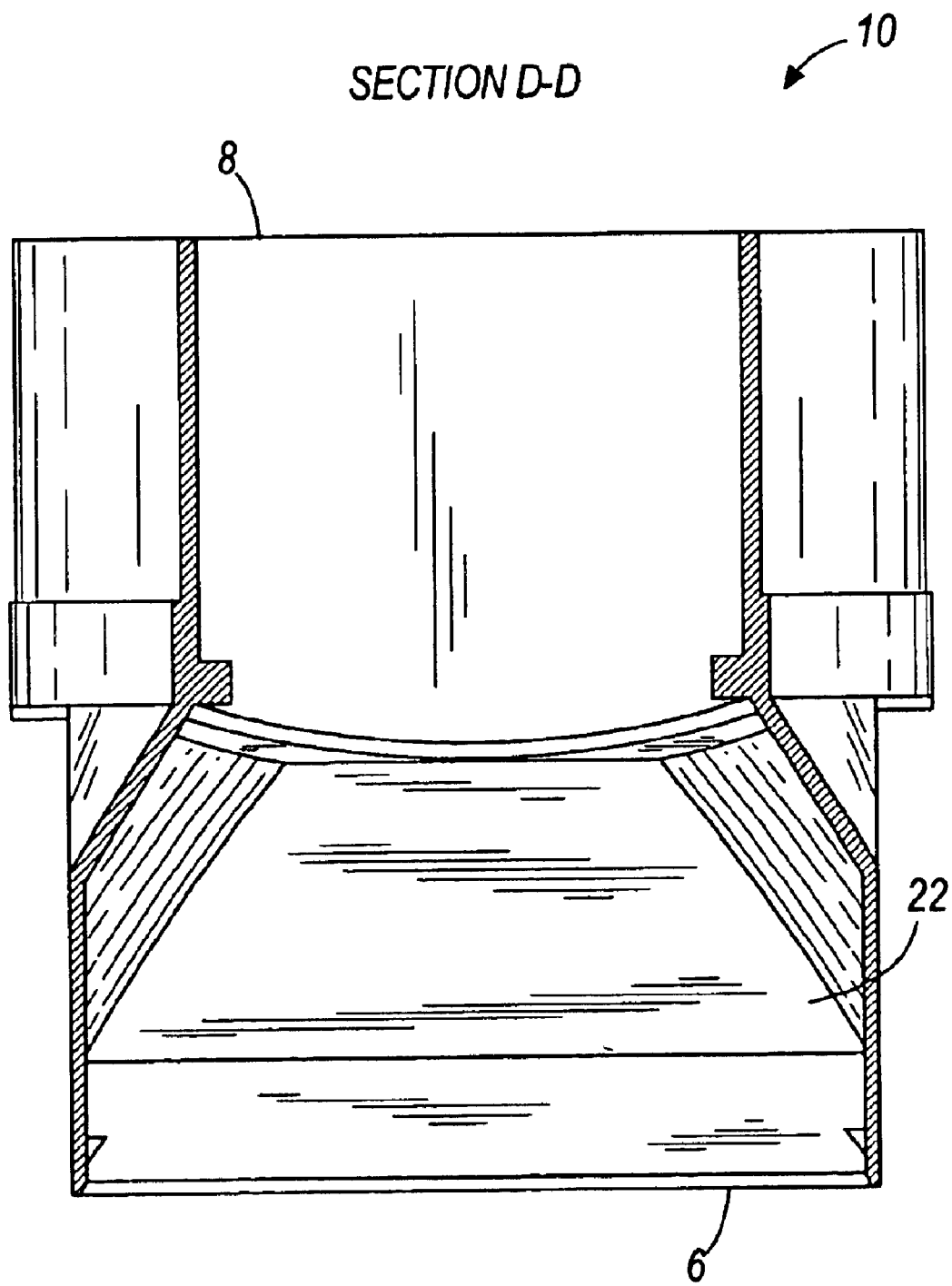
FIG. 8 is a cross-sectional view of the duct connector shown in FIGS. 1–4, taken along lines D—D of FIG. 4.
Figure 9:
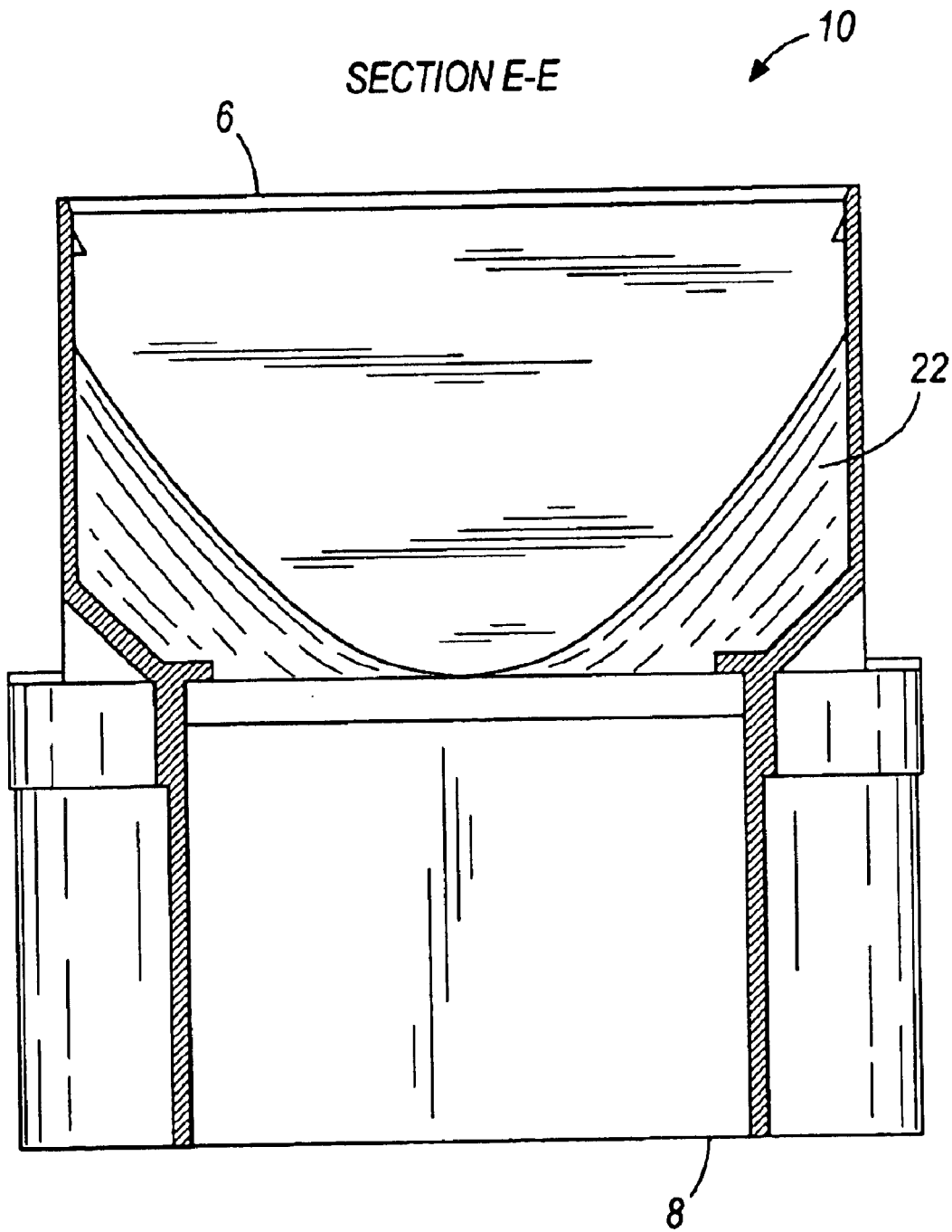
FIG. 9 is a cross-sectional view of the duct connector shown in FIGS. 1–4, taken along lines E—E of FIG. 3.
Figure 10:
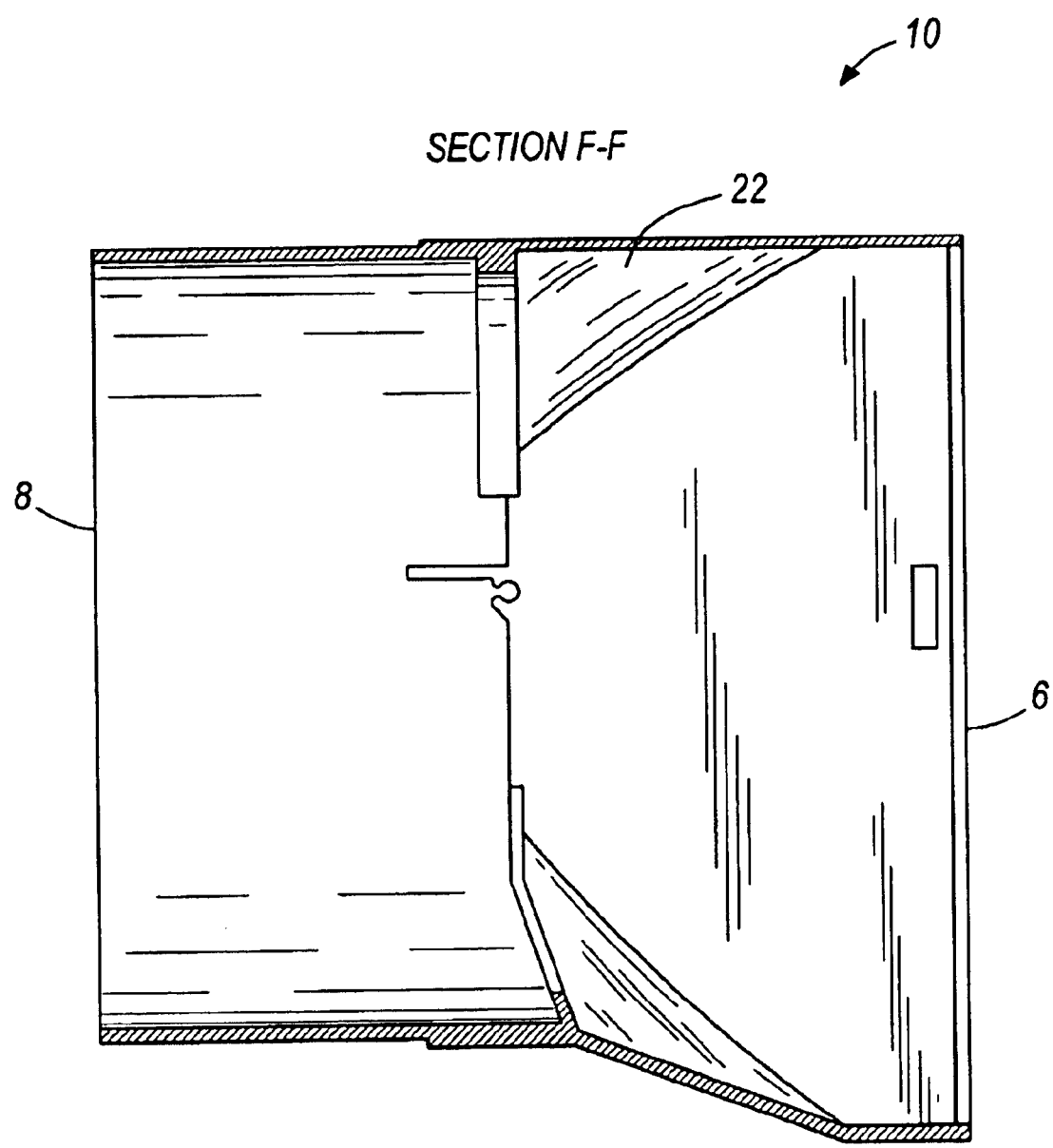
FIG. 10 is a cross-sectional view of the duct connector shown in FIGS. 1–4, taken along lines F—F of FIG. 3.

Although references are made below to directions, such as left, right, up, down, top, bottom, front, rear, back etc., in describing the drawings, they are made relative to the drawings (as normally viewed) for convenience. These directions are not intended to be taken literally or limit the present invention in any form.

DETAILED DESCRIPTION

FIGS. 11–20 illustrates a duct connector 110 for connecting a housing and an air duct (not shown). As described above, the exhaust outlet of many existing housings is rectangular in shape, and often needs to be connected to air ducts that have a round cross-sectional shape as described above. Therefore, one end 106 of the illustrated duct connector 110 is rectangular in shape in order to facilitate connection to a rectangular exhaust outlet of a housing, while another end 108 of the illustrated duct connector 110 is round in shape in order to facilitate connection to an air duct having a round cross-sectional shape.

The duct connector 110 of the present invention is preferably employed to connect a fan or blower housing with an air duct. A fan (not shown) powered by a motor (also not shown) is used to generate air flow through the duct connector 110 to the air duct. It should be noted, however, the duct connector 110 can instead be employed to connect any other type of housing having a rectangularly-shaped exhaust outlet with a round air duct. A number of significant advantages of the present invention are related to smooth airflow transition from a passage or outlet having a rectangular cross-sectional shape and a passage or inlet having a round cross-sectional shape. Therefore, one having ordinary skill in the art will appreciate that the duct connector 110 can even be employed to connect a duct having a rectangular cross-sectional shape with a duct having a round cross-sectional shape, to connect a duct having a round cross-sectional shape with an round inlet of a housing, or even to connect a rectangular exhaust outlet of a housing with a round inlet of another housing. In this regard, the ends 106, 108 of the duct connector do not necessarily need to be connected directly to housing(s) or duct(s), and can instead be connected thereto by any conventional connecting elements and devices, including without limitation joints, collars, clamps, hose connectors, and the like.

The duct connector 110 of the illustrated preferred embodiment is adapted for connection to an inlet of an air duct having a round cross-sectional shape. However, the cross-sectional shape of the air duct can be any rotund cross-sectional shape, including without limitation oval and elliptical shapes. As used herein and in the appended claims, the term "round" (used in connection with an outlet or inlet of a duct, housing, or of the duct connector 110) is intended to encompass round and rotund shapes.

Figure 11:
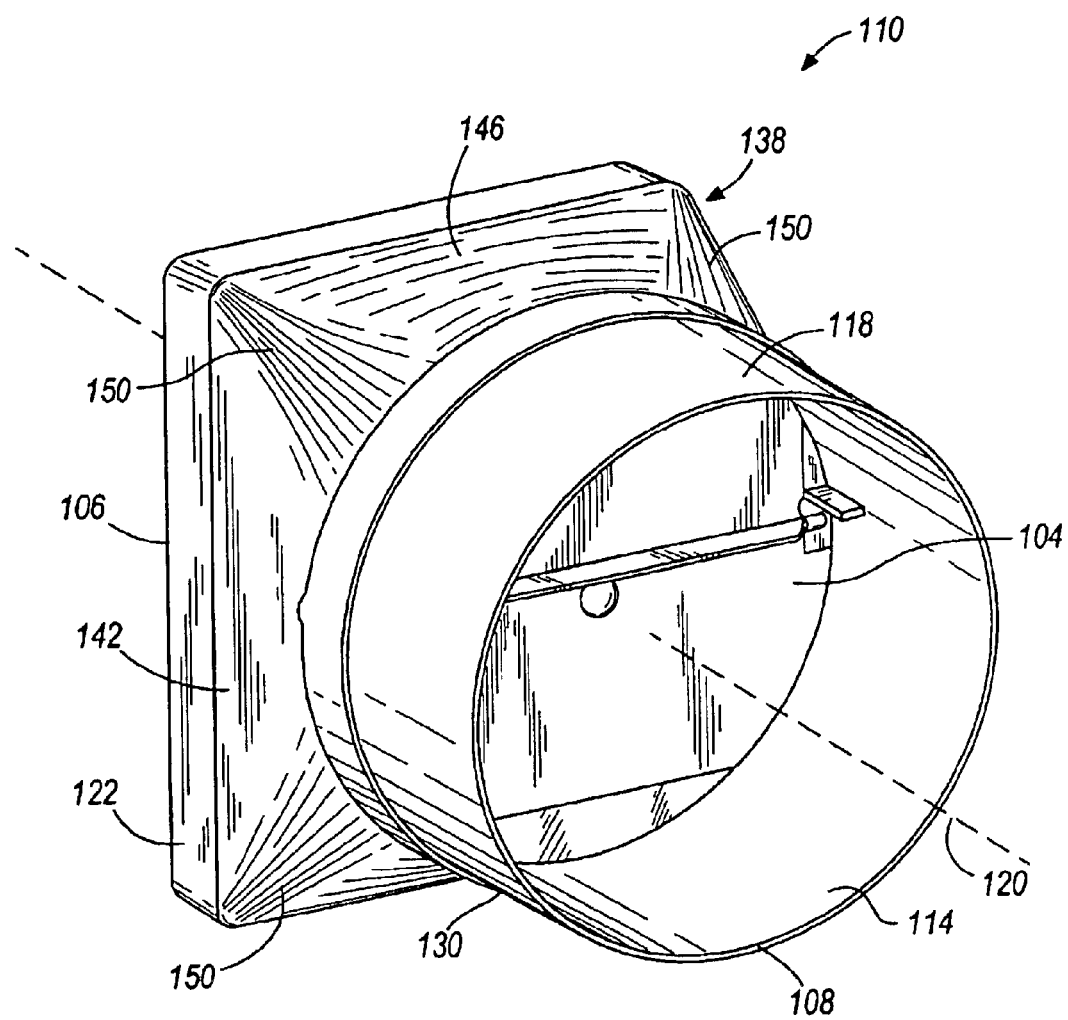
FIG. 11 is a front perspective view of a duct connector according to a preferred embodiment of the present invention.
Figure 12:
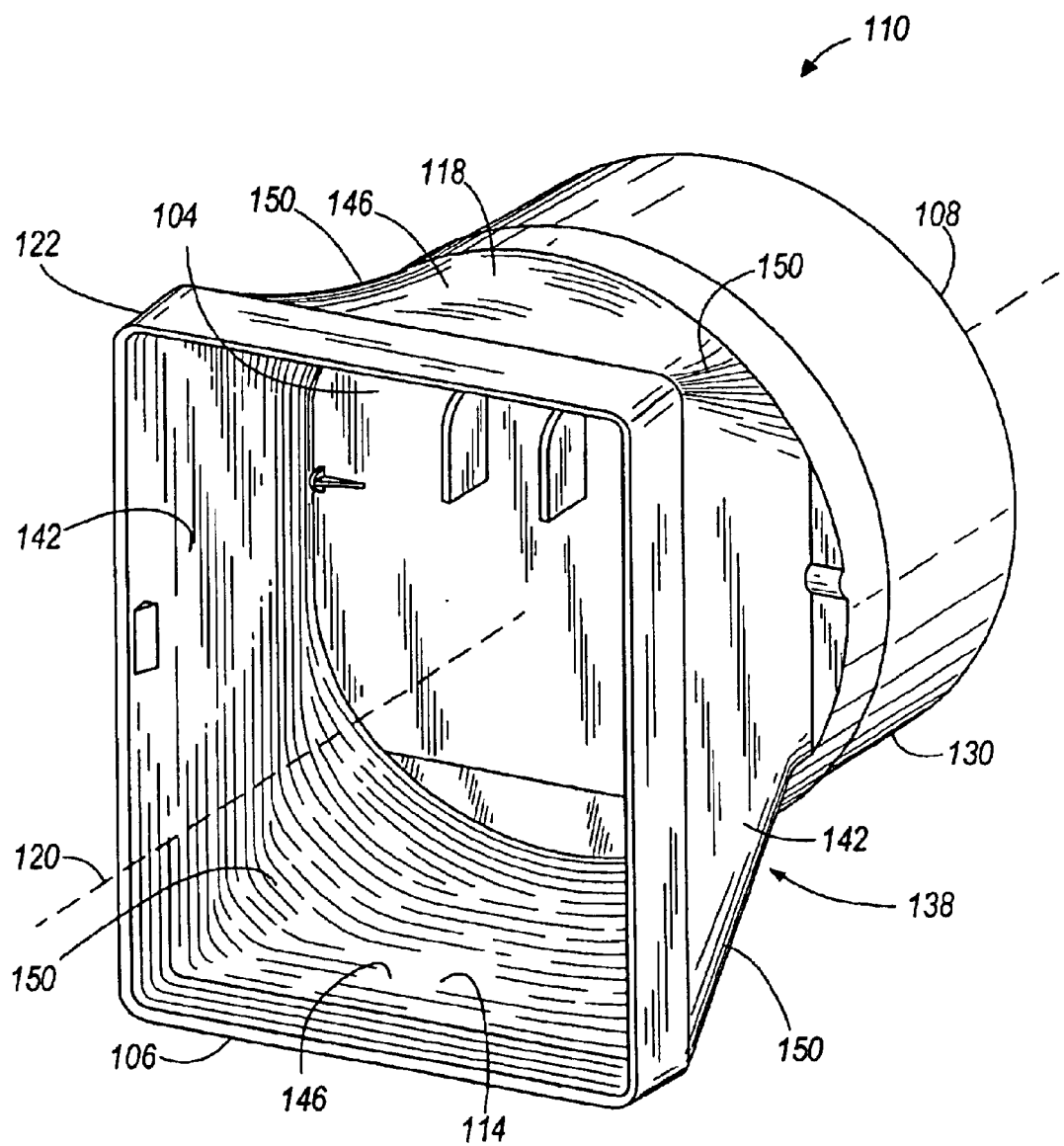
FIG. 12 is a rear perspective view of the duct connector shown in FIG. 11.

In some embodiments of the present invention, the duct connector 110 has a movable flap 104 connected therein. Any type of flap 104 can be employed with the duct connector 110. The flap 104 can take any form for partially, substantially, or entirely closing the duct connector 110 in at least one position of the flap 104. By way of example only, the flap 104 in the illustrated preferred embodiment is pivotably connected to the interior of the duct connector 110 about a snap-fit pivot as best shown in FIGS. 11 and 12. Rather than pivoting about a central position as shown in the figures, the flap 104 can instead pivot about an end or an off-center position of the flap 104 as desired. It will be appreciated by one skilled in the art that other manners of movably connecting the flap 104 within the duct connector 110 are possible, each one of which falls within the spirit and scope of the present invention.

Figure 20:
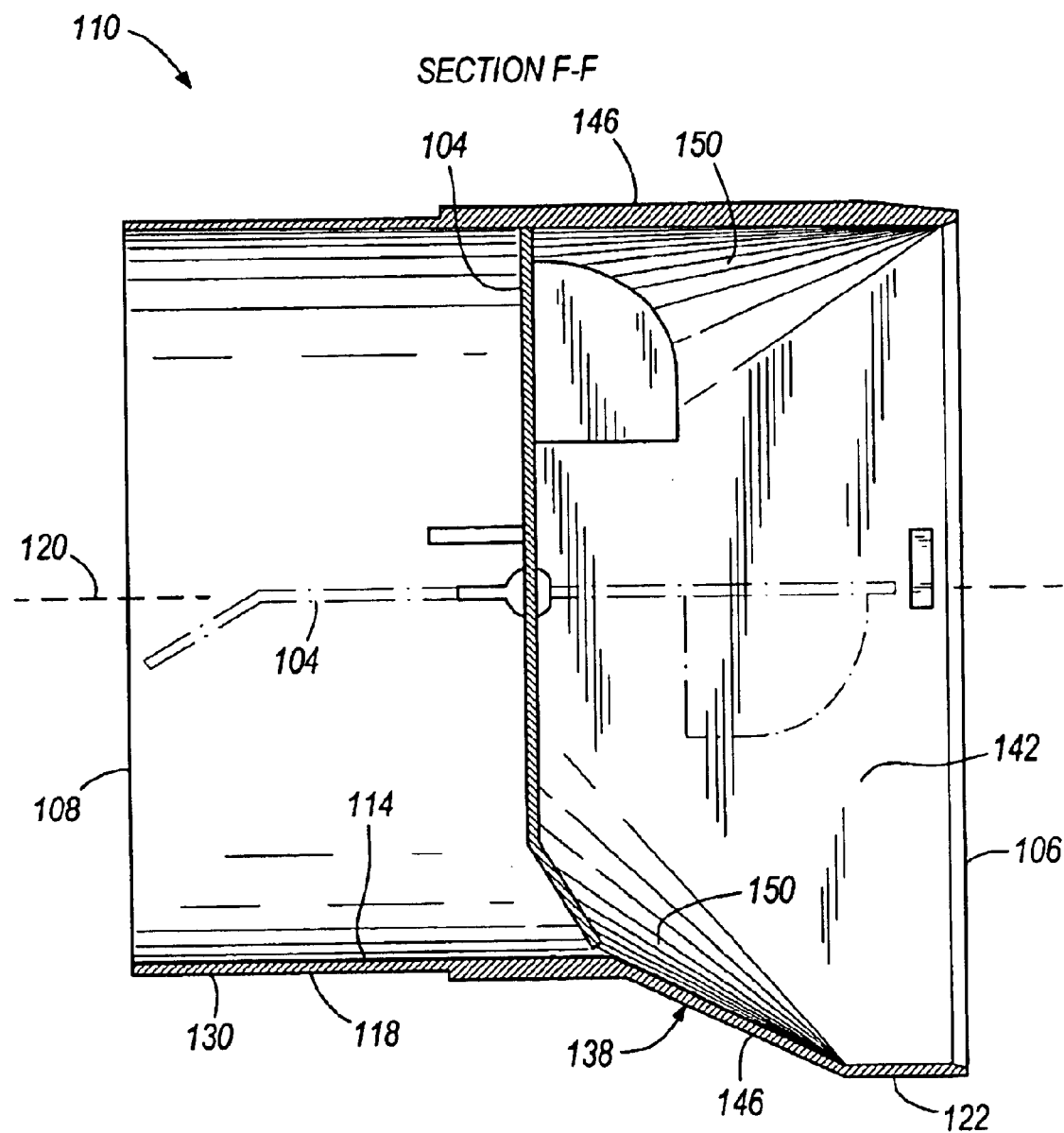
FIG. 20 is a cross-sectional view of the duct connector shown in FIGS. 11–14, taken along lines F—F of FIG. 13.

In the illustrated preferred embodiment, the flap 104 prevents fluid flow through the duct connector 110 from reversing direction. The duct connector 110 with the flap 104 can be used with an exhaust vent in which flow is only desired in one direction. In the open position(s) of the flap 104, fluid flow in the normal direction preferably pivots the flap 104 to a position substantially aligned with longitudinal axis 120 or oriented at a slight angle with respect thereto. In a closed position, fluid flow in the opposite direction preferably pivots the flap 104 to a position substantially transverse to the longitudinal axis 120 of the duct connector 110, thereby blocking air flow through the duct connector 110. FIG. 20 illustrates the flap 104 in the closed position in solid lines, and illustrates the flap 104 in the open position in broken lines.

The flap 104 of the illustrated preferred embodiment is mounted in a central location along the length of the duct connector 110. However, in other embodiments the flap 104 can be mounted at or near either end 106, 108 of the duct connector 110 or can be mounted at any position between the ends 106, 108 as desired.

The duct connector 110 of the illustrated preferred embodiment is generally tubular and has an inner surface 114 and an outer surface 118. The duct connector 110 defines a fluid flow path from the rectangular end 106 of the duct connector 110 to the round end 108. As mentioned above, the duct connector 110 has an axis 120 extending therethrough. The inner surface 114 of the duct connector 110 is defined by walls (described in greater detail below) surrounding the axis 120 and located a radial distance from the axis 120. By virtue of the shape of the walls, air flow passes through the duct connector 110 and is influenced by the inner surface 114.

As mentioned above, the duct connector 110 illustrated in FIGS. 11–20 preferably has a rectangular cylindrical passage 122 near one end 106 of the duct connector 110, and a round cylindrical passage 130 near the opposite end 108 of the duct connector 110. As used herein and in the appended claims, the term "cylindrical" does not by itself indicate or imply any particular shape to a passage defined by one or more walls about the axis 120, and is intended to encompass other cross-sectional shapes defined by the wall(s). The duct connector 110 preferably compresses or funnels fluid flow from the rectangular end 106 of the duct connector 110 to the round end 108. The cross-section of the duct connector 110 near the outlet 108 is preferably smaller than the cross-section of the duct connector 110 near the inlet 106, although the present invention can be practiced with other relative ratios of the duct connector inlet 106 and outlet 108.

With particular reference to FIGS. 11 and 12, the duct connector 110 includes an intermediate passage 138 between the rectangular passage 122 and the round passage 130. The intermediate passage 138 is a transitional passage that transitions the duct connector 110 from a rectangular cross-section to a round cross section. Air flow enters the duct connector 110 through the rectangular passage 122, flows through the intermediate passage 138, and exits the duct connector 110 through the round passage 130.

Figure 13:
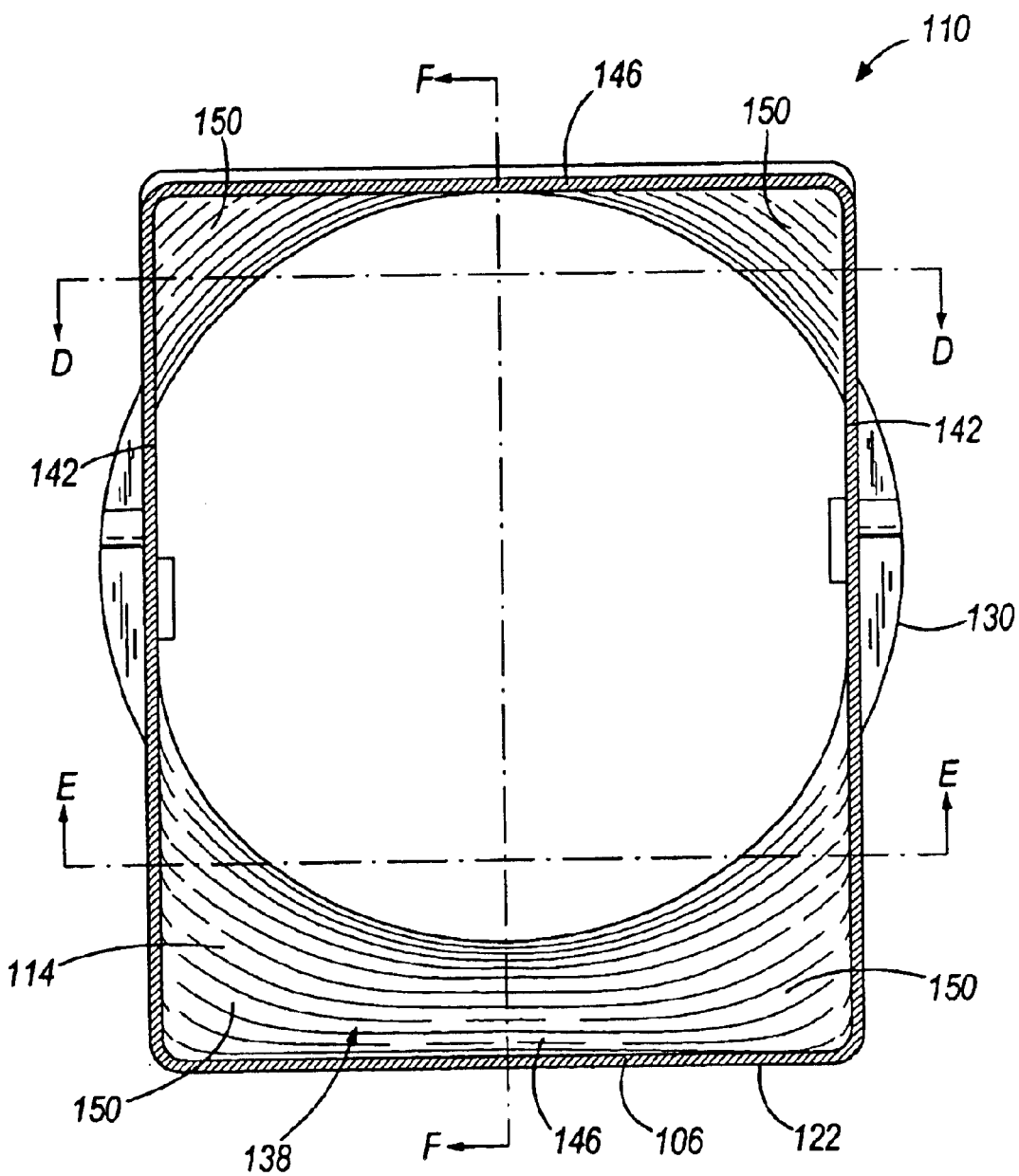
FIG. 13 is an elevational view of an end of the duct connector shown in FIGS. 11 and 12.
Figure 14:
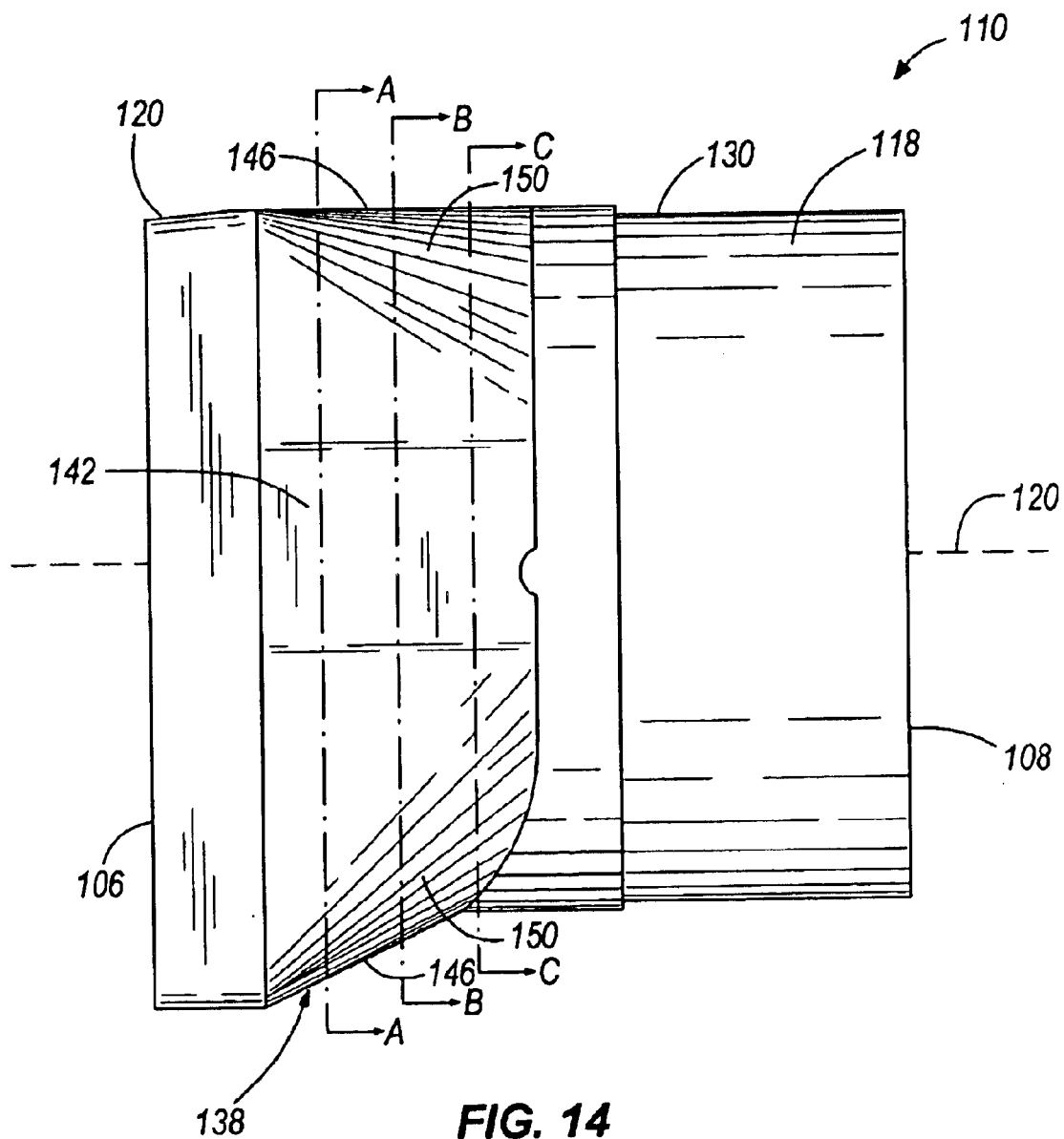
FIG. 14 is an elevational view of a side of the duct connector shown in FIGS. 11–13.

FIG. 13 shows an end view of the duct connector 110, and illustrates the view of air flow approaching the rectangular passage 122. In the illustrated preferred embodiment, the duct connector 110 includes two side walls 142 disposed opposite one another, and two end walls 146 disposed opposite one another adjacent the side walls 142. As shown in FIGS. 11–14, the side walls 142 and end walls 146 extend axially along the intermediate passage 138 from the rectangular passage 122 to the round passage 130. As described in greater detail below, the end walls 146 are preferably curved, and are concave with respect to the longitudinal axis 120.

As shown in the figures, the intermediate passage 138 provides a smooth transition of the inner surface 114 from the rectangular passage 122 to the round passage 130. More specifically, the intermediate passage is preferably substantially free from steps and sharp corners in order to provide improved air flow between the rectangular and round passages 122, 130. The smooth transition of the intermediate passage 138 minimizes turbulence in the air flow through the duct connector 110, and reduces noise related to air flow through the duct connector 110. As described below, the reduced turbulence in the duct connector 110 increases air flow performance, and permits the fan motor (not shown) to be run at a slower RPM for more efficiency and for lower noise.

As shown in FIGS. 11 and 12, the intermediate passage 138 of the illustrated preferred embodiment includes transitional surfaces 150 that run along the passage 138 and interconnect the side walls 142 and the end walls 146. Each transitional surface 150 smoothly connects adjacent side and end walls 142, 146 without sharp breaks or angles that can otherwise lower flow efficiency and trigger heightened turbulence as air is funneled toward the round end 108 of the duct connector 110. The transitional surfaces 150 are preferably continuous and seamless with respect to their adjacent side and end walls 142, 146, and are preferably curved, rotund, convex surfaces interconnecting these walls 142, 146 along the inner surface 114. The transitional surfaces 150 are preferably non-faceted and are substantially free of sharp corners for the same reasons described above.

The shape of the inner surface 114 is significant to and influences air flow through the duct connector 110 because the air flow contacts the inner surface 114 as it passes through the duct connector 110. Therefore, the curved transitional surfaces 150 along the inner surface 114 are more significant to air flow through the duct connector 110 than along the outer surface 118. The outer surface 118 of the duct connector 110 can have any shape desired (depending at least in part upon the thickness of the duct connector 110 at various points), but is preferably similar in contour to the shape of the inner surface 114 for purposes of material savings and/or manufacturability.

Figure 15:
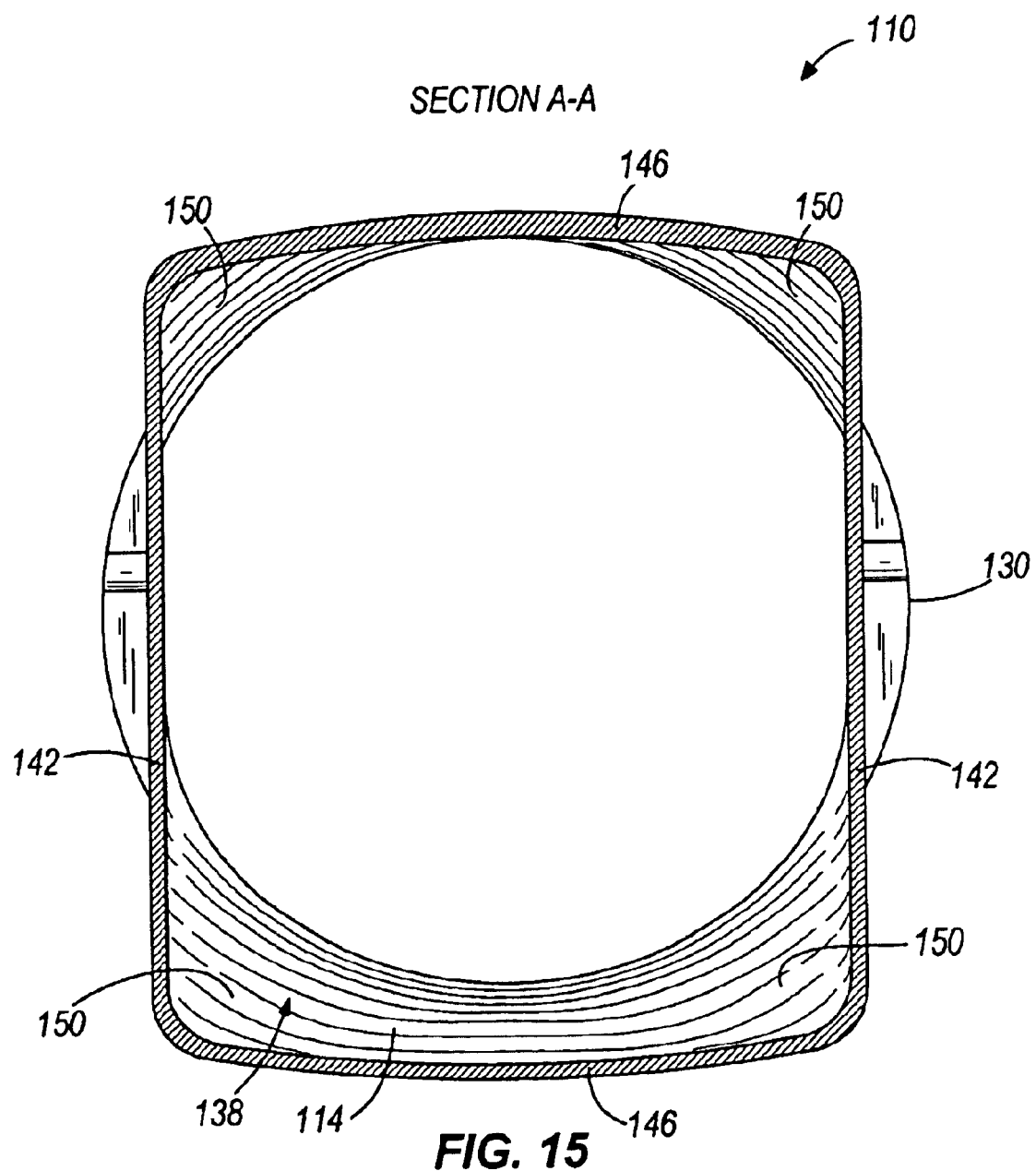
FIG. 15 is a cross-sectional view of the duct connector shown in FIGS. 1–4, taken along lines A—A of FIG. 14.
Figure 16:
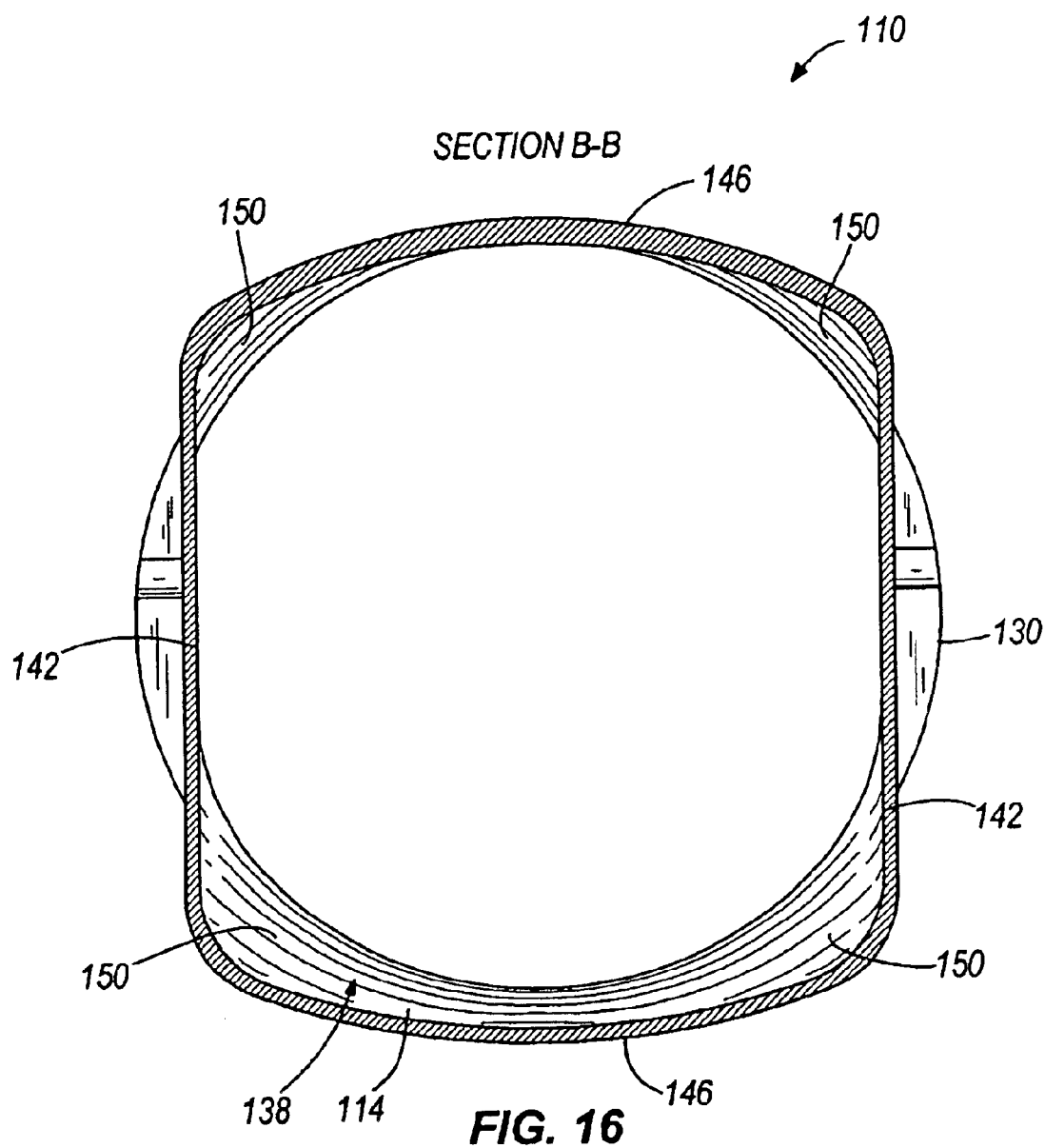
FIG. 16 is a cross-sectional view of the duct connector shown in FIGS. 11–14, taken along lines B—B of FIG. 14.
Figure 17:
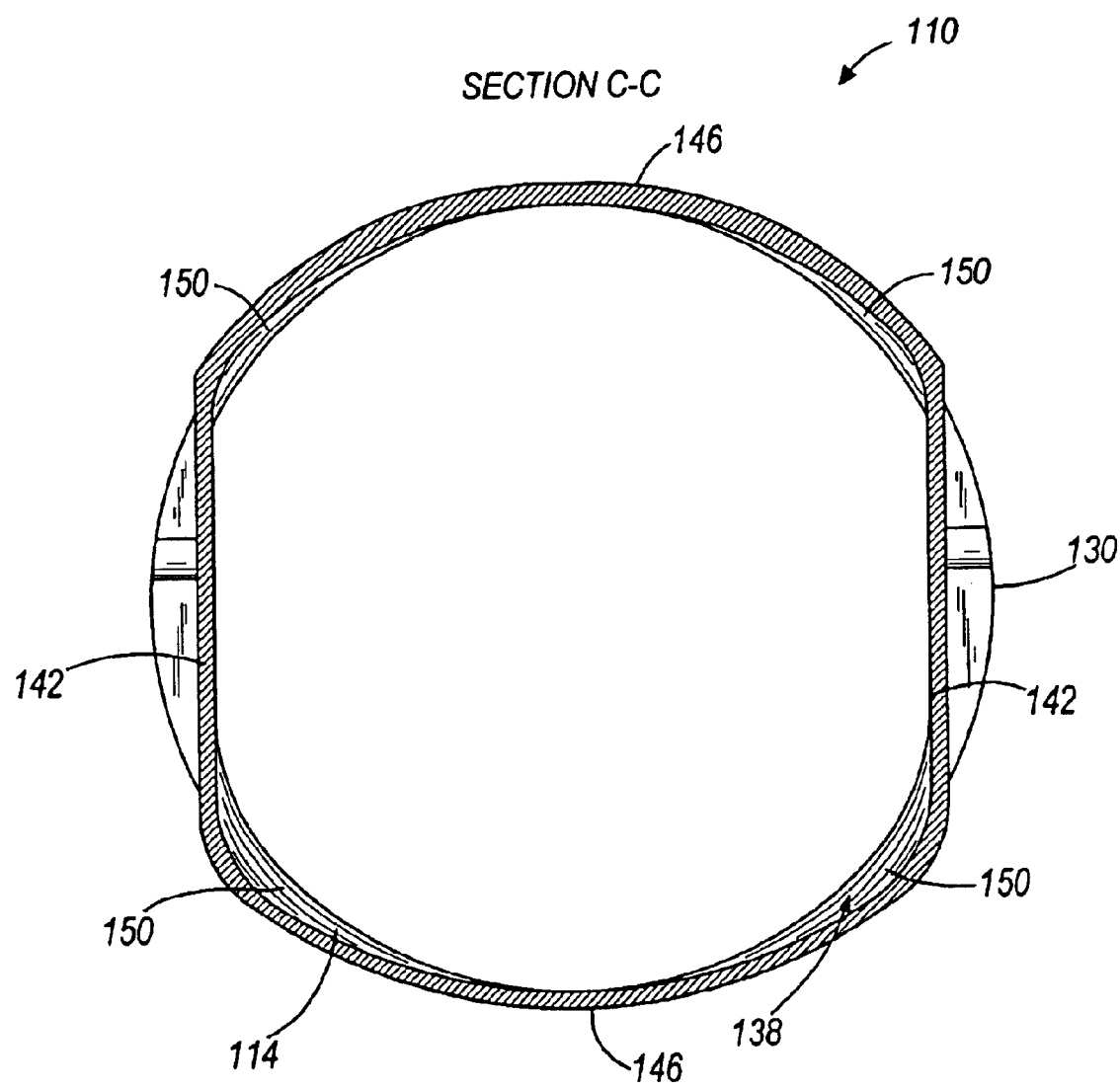
FIG. 17 is a cross-sectional view of the duct connector shown in FIGS. 11–14, taken along lines C—C of FIG. 14.

FIGS. 15-17 show cross-sections of the duct connector 110 according to the illustrated preferred embodiment. More specifically, FIGS. 15–17 are cross-sections of the duct connector 110 taken at various points along the intermediate passage 138 in planes substantially perpendicular to the longitudinal axis A. FIGS. 15–17 show the curved transitional surfaces 150 and curved end walls 146. FIG. 15 is a cross-section of the intermediate passage 138 near the rectangular passage 122. FIG. 17 is a cross-section of the intermediate passage 138 near the round passage 130. FIG. 16 is a cross-section of the intermediate passage 138 taken at a location between those of FIGS. 15 and 17. As shown in FIGS. 15-17, there are no sharp corners between the side walls 142 and the end walls 146. In this regard, the transitional surfaces 150 provide a smooth surface transition between the adjacent walls 142, 146 as described above.

In FIGS. 15–17, the transitional surfaces 150 have a curved radius along the inner surface 114 of the duct connector 110 between each side wall 142 and adjacent end wall 146. The radius of curvature of the transitional surface 150 (between adjacent walls 142, 146) preferably changes and increases along the intermediate passage 138 from the rectangular passage 122 to the circular passage 130, thereby further providing for a smooth transition as air is funneled along the intermediate passage 138. In other words, the radius of curvature of the transitional surfaces 150 preferably increases from FIG. 15 to FIG. 16 and to FIG. 17 as the curved transitional surfaces 150 become more gradual between adjacent walls 142, 146. In other words, the arcuate length of the transitional surface 150 between adjacent side and end walls 142, 146 preferably increases as the transitional surface 150 progresses from the rectangular passage 122 to the circular passage 130. This increase in the arcuate length of the transitional surface can be seen in the comparison of FIGS. 15–17.

As shown in FIGS. 15–17, the end walls 146 are preferably curved and concave with respect to the longitudinal axis 120. Preferably, the radius of curvature of the end walls 146 decreases as the end walls 146 progress along the intermediate passage 138 from the rectangular passage 122 to the round passage 130 as shown in FIGS. 15–17. In some highly preferred embodiments such as that shown in the figures, as the intermediate passage 138 progresses from the rectangular passage 122 to the round passage 130, the radius of curvature of the transitional surfaces 150 continues to increase and the radius of curvature of the end walls 146 continues to decrease until they eventually coincide at the round passage 130 in a circular cross section.

Figure 18:
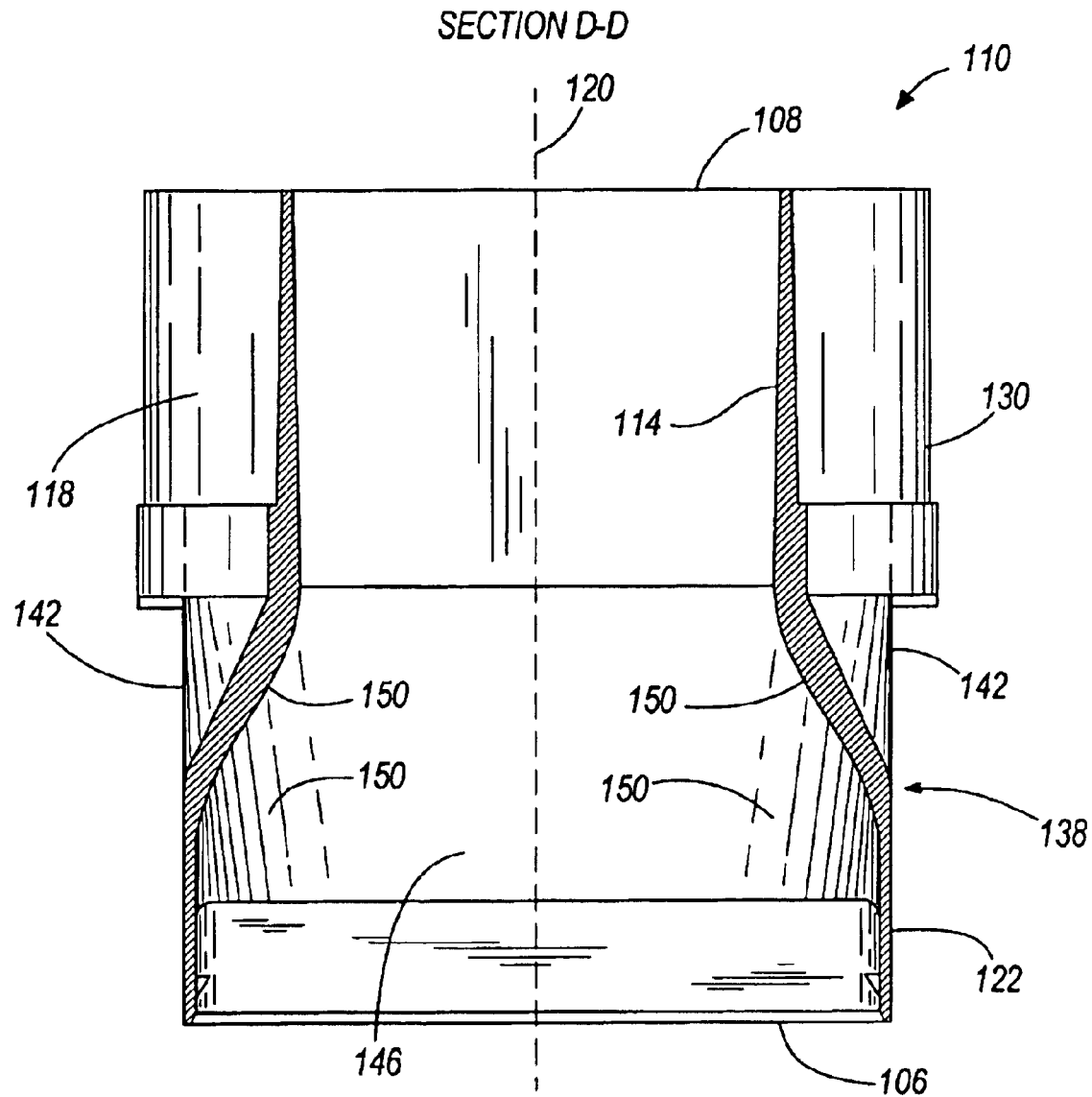
FIG. 18 is a cross-sectional view of the duct connector shown in FIGS. 11–14, taken along lines D—D of FIG. 14.
Figure 19:
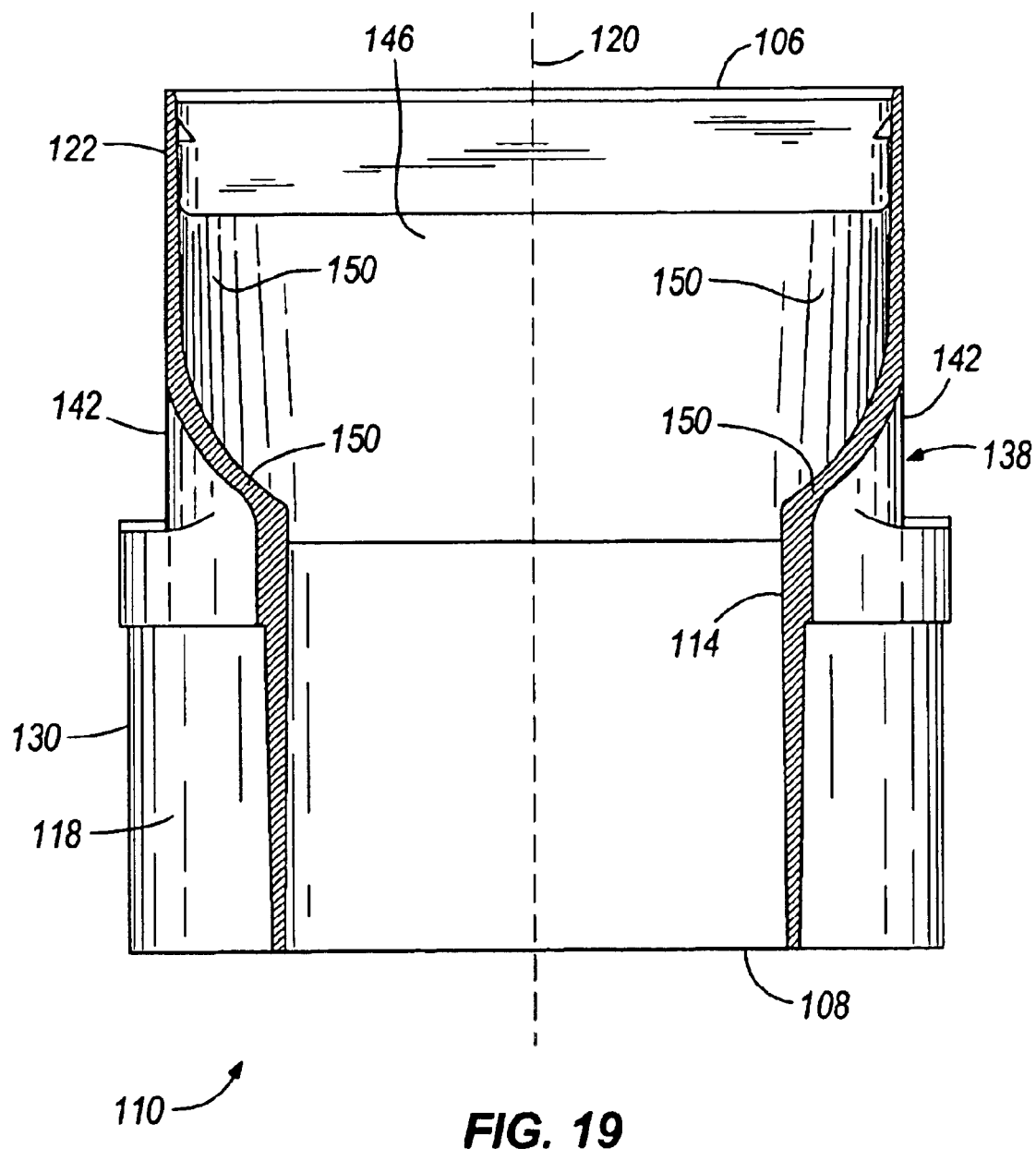
FIG. 19 is a cross-sectional view of the duct connector shown in FIGS. 11–14, taken along lines E—E of FIG. 13.

FIGS. 18 and 19 illustrate cross-sections of the duct connector 110 taken along planes extending in the axial direction as shown in FIG. 13. FIGS. 18 and 19 show the smooth transition of the intermediate passage 138 from the rectangular passage 122 to the round passage 130. As mentioned above, the duct connector 110 funnels fluid flow toward the round passage 130. In the illustrated preferred embodiment, the cross-sectional area of the outlet end near the round passage 130 is smaller than the cross-sectional area of the inlet near the rectangular passage 122. The interior surfaces of the side and end walls 142, 146 and transitional surfaces 150 preferably have no sharp corners, breaks, or abrupt discontinuities along the intermediate passage 138 as shown in FIGS. 18 and 19. Therefore, air passing through the intermediate passage preferably encounters no surface or feature that is more likely to cause turbulence.

As air flows through the duct connector 110, the cross-section of the duct connector 110 transitions from a rectangular cross-section to a round cross-section. As mentioned above, the smooth transition of the walls 142, 146 along intermediate passage 138 between the rectangular passage 122 and the round passage 128 reduces turbulence within the duct connector 110. The smooth curved transitional surfaces 150 interconnecting the side walls 142 and end walls 146 along the intermediate passage 138 also reduces turbulence within the duct connector 110. Due to the smooth transitions, the duct connector 110 can improve air flow while reducing the fan or blower speed in comparison with prior art connectors.

Generally, fans used with duct connectors are classified by rated performance in terms of air flow through the connector in cubic feet per minute (cfm). Common classifications for connectors are 50 cfm, 80 cfm, 110 cfm, and 150 cfm. Fan or blower motor speed is commonly measured in revolutions per minute (rpm), and the noise generated by the fan and air flow through the connector is commonly measured in sones. The duct connector 110 of the present invention can achieve the same fan rated performance of air flow in cfm as prior art connectors, while permitting the rpm of the same fan motor to be reduced, thereby resulting in energy saving and significantly reducing the amount of noise emitted by the fan motor and duct connector 110.

Examples of the improved air flow and sound provided by the present invention are set forth in the following table, which shows comparable air flow rates through a duct connector according to the prior art and through a duct connector according to the present invention. Using similar air flow rates as a basis for comparison between these duct connectors, it can be seen that the fan speed (in rpm) is significantly lower using the duct connector according to the present invention, thereby saving energy and reducing fan noise two highly desirable features of a duct connector.

TABLE 1

| Rated Performance | New Duct Connector | | | Prior Art Duct Connector | | | Comparative Difference | |
|---|---|---|---|---|---|---|---|---|
| (cfm) | (cfm/rpm/sones) | | | (cfm/rpm/sones) | | | (rpm) | (sones) |
| 50 | 50.9 | 700 | 0.45 | 52.2 | 732 | 0.50 | 32 | .05 |
| 80 | 80.2 | 814 | 0.84 | 80.8 | 869 | 1.05 | 55 | .21 |
| 110 | 111.0 | 983 | 1.30 | 110.6 | 1056 | 2.02 | 73 | .72 |
| 150 | 150.7 | 1188 | 2.84 | 151.9 | 1308 | 3.33 | 120 | .49 |

In Table 1, the "Rated Performance" represents the flow rate through the duct connector in cfm, and the table represents a comparison at four different performance ratings between air flow through a duct connector 110 embodying the present invention, and a prior art duct connector. The "New Duct Connector" column and "Prior Art Duct Connector" column represent air flow at a comparable cfm. The "Comparative Difference" column illustrates the reduction in rpm and sones achieved by the duct connector 110 embodying the present invention over the prior art duct connector.

The embodiments of the present invention described above and the embodiment of the present invention illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, the illustrated preferred embodiment of the duct connector 110 has two substantially flat side walls 142 and two curved end walls 146 as best shown in FIGS. 15–17. Although such a shape of the intermediate passage 138 is highly desirable, it should be noted that other shapes are possible for these walls 142, 146. By way of example only, the side walls 142 can instead be curved while the end walls 146 can be substantially flat while still employing the principles and primary features of the present invention. As another example, any or all of these four walls 142, 146 can be flat or curved as desired while still having the curved transitional surfaces 150 and while still providing the smooth transition along the intermediate passage 138 as described above. In such cases, the advantages provided by the present invention can still be generated.

What is claimed is:

1. A duct connector comprising:
   a substantially rectangular passage disposed at a first end of the duct connector and through which air flow enters the duct connector;
   a substantially round passage disposed at a second end of the duct connector and through which air flow exits the duct connector; and
   a seamless intermediate passage extending between the rectangular passage and the round passage and including:

at least two side walls disposed substantially opposite each other;

at least two end walls disposed substantially opposite each other; and substantially continuous curved convex transitional surfaces seamlessly interconnecting each side wall to adjacent end walls.

2. The duct connector of claim 1, further comprising a flap rotatably mounted within the duct connector adjacent the intersection of the intermediate passage and round passage.

3. The duct connector of claim 1, wherein the curvature of the transitional surface is tangential to the adjacent side wall and tangential to the adjacent end wall.

4. A duct connector comprising:

a substantially rectangular passage disposed at a first end of the duct connector and through which air flow enters the duct connector;

a substantially round passage disposed at a second end of the duct connector and through which air flow exits the duct connector; and a seamless intermediate passage extending between the rectangular passage and the round passage and including:

at least two side walls disposed substantially opposite each other; and a single substantially smooth transitional surface seamlessly interconnecting each side wall with an adjacent end wall.

5. The duct connector of claim 4, further comprising a flap rotatably mounted within the duct connector adjacent an intersection of the intermediate passage and the substantially round passage.

6. A duct connector comprising:

a substantially rectangular passage disposed at a first end of the duct connector and through which air flow enters the duct connector;

a substantially round passage disposed at a second end of the duct connector and through which air flow exits the duct connector; and a seamless intermediate passage extending between the rectangular passage and the round passage and including:

at least two side walls disposed substantially opposite each other; and a non-faceted transitional surface seamlessly interconnecting each side wall to adjacent end walls to surround an axis through the duct connector.

7. The duct connector of claim 6, wherein each transitional surface is tangential to a side wall and an adjacent end wall.

8. A duct connector comprising:

a substantially rectangular passage disposed at one end of the duct connector;

a substantially round passage disposed at the opposite end of the duct connector; and a seamless intermediate passage extending between the rectangular passage and the round passage and including:

at least two side walls disposed substantially opposite each other;

at least two end walls disposed substantially opposite each other; and curved transitional surfaces seamlessly interconnecting each side wall to an adjacent end wall, each transitional surface being tangential to an adjacent side wall and end wall.

9. The duct connector of claim 8, further comprising a flap rotatably mounted within the duct connector adjacent an intersection of the intermediate passage and the round passage.

10. A duct connector, comprising:

a first end having a substantially rectangular passage;

a second end having a rotund passage in fluid communication with the substantially rectangular passage; and at least one wall defining a transitional passage between and connecting the substantially rectangular passage and the rotund passage, the transitional passage being seamless and substantially free from steps and sharp corners.

11. The duct connector of claim 10, wherein the transitional passage is at least partially defined by opposing substantially flat walls joined by opposing curved walls.

12. The duct connector of claim 11, wherein the curved walls are concave in relation to fluid flow.

13. The duct connector of claim 11, wherein each flat wall is joined to adjacent curved walls with curved transitional surfaces.

14. The duct connector of claim 10, wherein the transitional passage is at least partially defined by walls surrounding a fluid flow path through the duct connector.

15. The duct connector of claim 14, wherein the walls are connected by smooth transitional surfaces.

16. The duct connector of claim 10, further comprising a flap disposed within the duct connector.

17. The duct connector of claim 16, wherein the flap is rotatably mounted within the duct connector.

18. The duct connector of claim 10, wherein the flap is mounted between the transitional passage and the rotund passage.

19. The duct connector of claim 10, wherein the transitional passage at outlet has smaller cross-sectional shape than the transitional passage at inlet.

20. A duct connector, comprising:

an inlet;

an outlet in fluid communication with the inlet;

one of the inlet and outlet having a substantially rectangular inner shape, another of the inlet and outlet having a rotund shape, the inlet and outlet at least partially defining a fluid path through the duct connector; and a plurality of walls connecting the inlet and the outlet and circumscribing the fluid path to define a plurality of seamless interfaces between adjacent pairs of the plurality of walls, each seamless interface having a rounded shape and defining a smooth and seamless transitional surface between adjacent walls.

21. The duct connector of claim 20, wherein the plurality of walls includes opposing flat walls and opposing curved walls presenting concave surfaces to a fluid path through the duct connector.

22. The duct connector of claim 20, further comprising a flap located within the duct connector.

23. The duct connector of claim 22, wherein the flap is rotatably mounted within the duct connector.

24. The duct connector of claim 22, wherein the flap is mounted between the plurality of walls and the outlet.

25. The duct connector of claim 20, wherein the inlet and outlet have respective cross-sectional areas, the cross-sectional area of the outlet being smaller than the cross-sectional area of the inlet.

26. A method of directing fluid flow from a rectangular inlet to a rotund outlet of a duct connector having a central axis, the method comprising:

receiving fluid through the rectangular inlet of the duct connector;

passing fluid flow past a plurality of walls surrounding the central axis and past a plurality of rounded transitional surfaces seamlessly connecting the plurality of walls;

diverting fluid flow in the connector toward the central axis with the plurality of walls and the plurality of rounded transitional surfaces;

funneling fluid flow from the plurality of walls and the plurality of rounded transitional surfaces to the rotund outlet; and passing fluid flow through the rotund outlet.

27. The method of claim 26, further comprising:

opening a flap located within the duct connector; and passing fluid flow past the flap.

28. The duct connector of claim 27, wherein the flap is located between the plurality of walls and the rotund outlet.

29. The duct connector of claim 26, further comprising compressing fluid flow by funneling fluid flow in a direction toward the rotund outlet.

* * * * *